United States Patent [19]

Epstein

[11] 3,714,476

[45] Jan. 30, 1973

[54] COMPRESSION ACCELOROMETER UTILIZING A LITHIUM NIOBATE PIEZOELECTRIC CRYSTAL

[75] Inventor: Howard C. Epstein, South Pasadena, Calif.

[73] Assignee: Becton, Dickinson Electronics Company, Pasadena, Calif.

[22] Filed: Jan. 29, 1971

[21] Appl. No.: 111,051

[52] U.S. Cl. ....................... 310/9.5, 310/8.4, 310/9.6

[51] Int. Cl. ............................. H01v 7/00, H01v 7/02

[58] Field of Search ..................... 310/8, 8.4, 9.5, 9.6; 252/62.9

[56] References Cited

UNITED STATES PATENTS

| | | | |
|---|---|---|---|
| 3,185,869 | 5/1965 | Shoor | 310/8.4 |
| 3,389,276 | 6/1968 | Gradin et al. | 310/8.4 |
| 3,487,238 | 12/1969 | Angleton et al. | 310/8.4 |

OTHER PUBLICATIONS

Hardware report dated January 1970 from Electro Technology, pp. 33–38, Jan. 1970.

Journal of the Acoustical Society of America, paper by Onoe, Warner and Coquin, 1967.

*Primary Examiner*—J. D. Miller
*Assistant Examiner*—Mark O. Budd
*Attorney*—Reed C. Lawlor

[57] ABSTRACT

The transducer of this invention utilizes an annular lithium niobate crystal operated in the compression mode with the sensitive axis of the crystal arranged at an angle of about −51.4° to the Z, or optical, axis of the crystal in the first and third quadrants of the Y-Z plane of the crystal. This accelerometer has high efficiency and operates effectively over a wide range of temperatures, including high temperatures above 1000° F.

8 Claims, 2 Drawing Figures

HOWARD C. EPSTEIN
INVENTOR

BY Reed Lawlor
ATTORNEY

COMPRESSION ACCELOROMETER UTILIZING A LITHIUM NIOBATE PIEZOELECTRIC CRYSTAL

CROSS REFERENCES TO RELATED APPLICATIONS

U.S. Pat. Application Ser. No. 50,657, filed June 29, 1970.

INTRODUCTION

This invention relates to transducers and more particularly to a piezoelectric accelerometer which is of high efficiency and is adapted to be operative over a wide range of temperatures, including high temperatures above 1000° F.

GENERAL DESCRIPTION OF THE INVENTION

The transducer of this invention makes use of a rotated Z-cut lithium niobate crystal of annular construction operated in the compression mode, thus taking optimum advantage of the characteristics of piezoelectric lithium niobate crystal material to achieve high sensitivity to compression forces in a high temperature environment. This invention will be described with reference to a compression accelerometer.

It is known that lithium niobate in monocrystalline form is piezoelectric and that its piezoelectric properties are preserved at high temperatures, such as at temperatures over 1400°F., as well as at a low temperature, such as temperatures of −60°F. The sensitivity of an accelerometer employing such a material depends in part on how the crystal is cut and how it is subjected to acceleration. This invention makes use of a rotated lithium niobate crystal operated in the compression mode with the axis of maximum sensitivity at an angle of about −51.4° from the Z, or optical, axis in the first and third quadrants of the Y-Z plane of the crystal. The electrodes are located on surfaces normal to the axis of maximum sensitivity and the compression forces are applied in directions perpendicular to these surfaces. This accelerometer not only has high sensitivity at high temperatures, but is also substantially free of cross-axis sensitivity. Furthermore, by taking special precautions, an accelerometer utilizing lithium niobate is provided for operating at such high temperatures over a long period of time.

This invention is particularly useful when employed as an accelerometer. Such an accelerometer has a high resonant frequency.

DRAWINGS

Various features of this invention are described below in connection with the accompanying drawings wherein:

FIG. 1 is an elevational view, partly in cross-section, of a balanced annular accelerometer of one embodiment constructed in accordance with this invention; and FIG. 2 is a perspective view employed to explain the invention.

DETAILED DESCRIPTION

Figure 1:
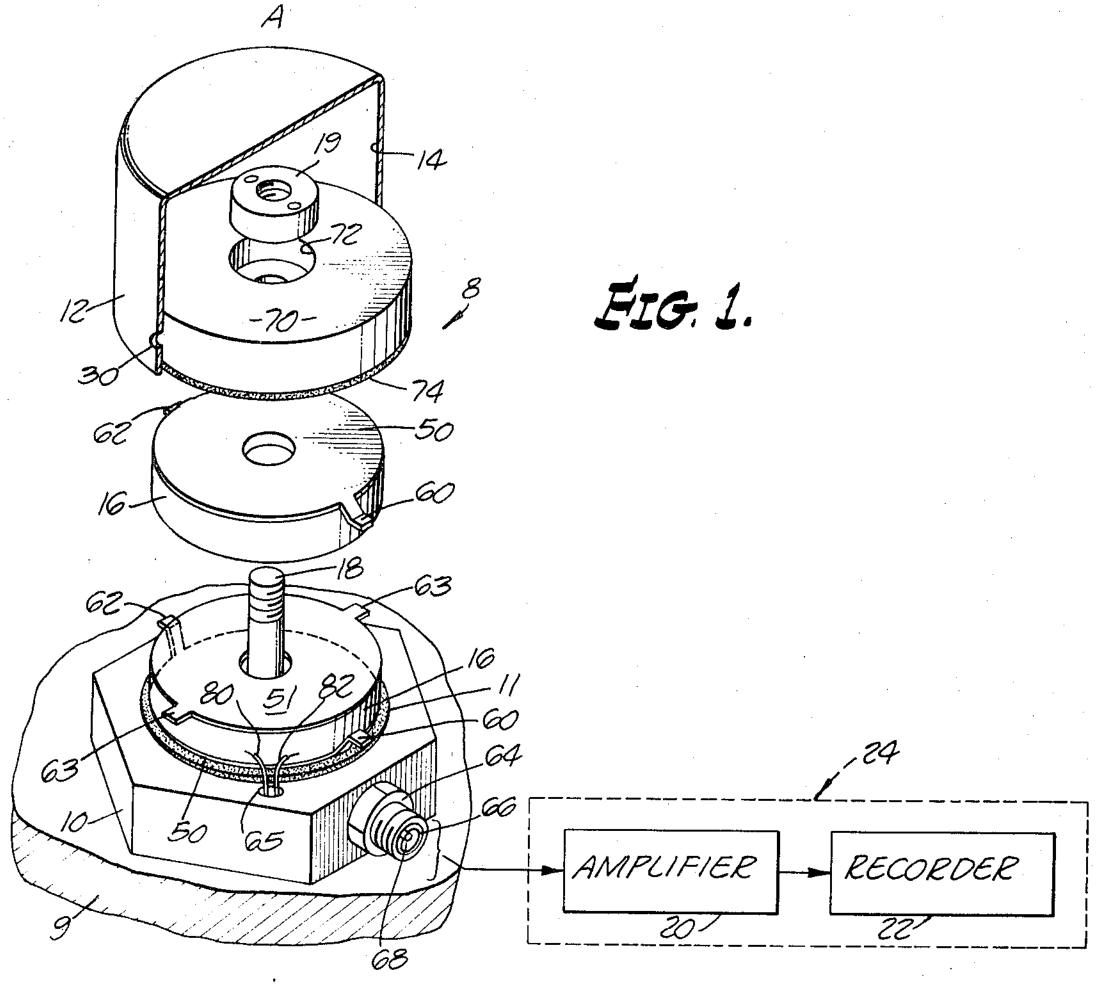

Referring to FIG. 1 there is illustrated an accelerometer 8 comprising a housing formed partly by a base 10 and a case 12 providing a cylindrical hollow cavity 14 and comprising a pair of acceleration sensing elements 16 concentrically mounted around and spaced from a post 18 projecting from the base 10. An insulator, in the form of an insulating disc or platform, 11 is mounted on the base 10 in order to provide electrical insulation between sensing units 16 and the base 10. The accelerometer 8 is rigidly secured to an object 9 undergoing test. The accelerometer is designed to have an axis A—A of maximum sensitivity parallel to the axis of the post 18 and perpendicular to the base 10. The accelerometer will be described as if mounted to detect the component of acceleration along a vertical axis.

The two acceleration sensing elements 16 comprise two piezoelectric crystals that produce electrical signals proportional to the acceleration of the accelerometer 8 in directions parallel to the A—A axis. The electrical signals generated by the crystals in response to such acceleration are supplied to a utilization device 24 in the form of a charge amplifier 20 and recorder 22.

The post 18 may be formed unitary with the base 10, or it may be threadably or otherwise secured thereto and fixed thereon by brazing or the like. The casing or case 12 is firmly secured to the base by welding or the like. THe casing is provided with a small perforation 30 to provide communication between the cavity 14 and the external atmosphere for a purpose to be described hereinafter.

The post 18 is provided with smooth cylindrical parallel surfaces that extend vertically and parallel to the acceleration axis A—A. THe upper end of post 18 is threaded in order to receive a threaded nut 19. Each of the acceleration sensing elements 16 is held between an outer electrode plate 50 and a common inner electrode plate 51.

The crystals 16 are both positioned with their positively polarized surfaces adjacent to the common electrode 51. Alternatively, the negatively polarized surfaces of both crystals 16 may be positioned adjacent to electrode 51. In either event, the two crystals are mounted with their Z-axes in antiparallel relation. The electrodes, or electrode plates, 50 and 51 are typically made of a soft electrically conductive metal, such as gold or the like.

It should be noted that this arrangement is symmetrical. Each electrode and crystal element has a smooth cylindrical hole in its center, enabling the stack of electrode plates and crystals to be arranged in radially spaced, insulating arrangement with respect to the post 18 which extends through the center of the stack upwardly from the base 10 without contacting any of the electrode plates or crystals. Alternatively, an insulating bushing may be mounted between the post 18 and the crystals and electrodes.

An annular inertial mass 70, having a central bore, is positioned on top of the stack of electrode plates and crystals. Electrical insulator 74 in the form of an insulating disc is positioned between the mass 70 and the upper electrode plate 50. The entire stack is secured to the base 10 by nut 19 which threadably engages the upper end of post 18 and seats in counterbore 72 formed in the top of the inertial mass 70.

The insulators 11 and 74 provide slip planes between the base 10 and adjacent electrode plate 50 and between inertial mass 70 and adjacent electrode plate 50. Lithium niobate crystals tend to expand and contract in different amounts along different axes and such a slip plane reduces distortions which might otherwise occur due to built up stresses between the adjacent crystal and base faces and between the adjacent crystal and inertial mass faces.

The faces 52*a* and 52*b* (see FIG. 2) of each of the crystals 16 are coated with electrodes 54*a* and 54*b*. Each electrode is formed of a thin inner layer LI of conductive material, such as evaporated or sputtered chromium, and a thin outer layer LO of non-corrosive, soft, malleable material such as gold. One face 52*b* of each crystal 16 is in metallic contact with one of the electrode plates 50. The other face 52*a* of each crystal is in metallic contact with the common inner electrode plate 51.

The crystals 16 are in the form of cylindrical rings or plates, and the cylindrical side walls are free of metallic material so that the two electrodes 54*a* and 54*b* on each crystal are insulated from each other, thereby forming a capacitance in which the two plates provided by the electrodes 54*a* and 54*b* are spaced apart by the dielectric material constituting the piezoelectric element. The faces of the crystals are cut and polished to an optical finish and the chromium and gold are thin and of uniform thickness. Furthermore the gold is sufficiently soft and malleable to assure complete even contact of the faces of the crystals with the electrode plates 50 and 51.

The inertial member 70, the crystals 66, and the electrode plates 50 and 51 are held in place by means of the post 18 extending vertically through them and through the oversized holes in the centers of the electrode plates and the crystals. The nut 19 applies compression to the entire stack.

The outer electrodes 50 are electrically connected together by means of two pairs of lugs 60 and 62. The lugs of each pair contact each other when the accelerometer is assembled. The pairs of lugs 60 and 62 are connected together through a lightweight flexible electric connection 80, which is insulated from base 10 and which leads through hole 65 in base 10 to contact 66 of cable connector 64. Electrode 51 is provided with opposed lugs 63 which are electrically connected together through another electric connection 82, which is insulated from base 10 and which leads through hole 65 to contact 68 of cable connector 64.

All of the mechanical parts, including the base 10, the post 18, the case 12 and the nut 19 are formed of Inconel. This metal is preferred for this purpose since its temperature coefficient of expansion corresponds closely to that of the lithium niobate crystal and is highly resistant to corrosion at high temperatures. The insulators 11 and 74 are formed of an electrically insulating material, such as alumina.

In the best embodiment of this invention known, the piezoelectric crystals 16 are in the form of annular lithium niobate crystals cut with their parallel faces 52*a* and 52*b* perpendicular to an axis in the Y–Z plane of the crystal, which axis is at an angle $\theta$ of about −51.4° ± 10° from the Z axis of a rotated Z-cut crystal. This is hereinafter referred to as the 2−51.4° plane. Thus, the Z−51.4° axis is rotated in the Y–Z plane about −51.4° from the Z axis of the crystal and is in the first and third quadrants. The Z−51.4° axis is parallel to the A—A axis of maximum sensitivity. The Y−51.4° axis is rotated in the Y-Z plane about −51.4° from the Y axis of the crystal and is in the second and fourth quadrants.

It has been determined experimentally that the accelerometer of this invention generates an output signal which is proportional to the component of acceleration perpendicular to the Z−51.4° ± 10° plane and is insensitive to components of acceleration in other directions. If the acceleration is parallel to an axis which is rotated less than about −41.4° or more than about −61.4° from the Z-axis in the Y-Z plane, an unacceptable amount of cross-axis sensitivity, that is, sensitivity to accelerations in other directions, will occur. The accelerometer produces substantially no response to shear stresses.

Figure 2:
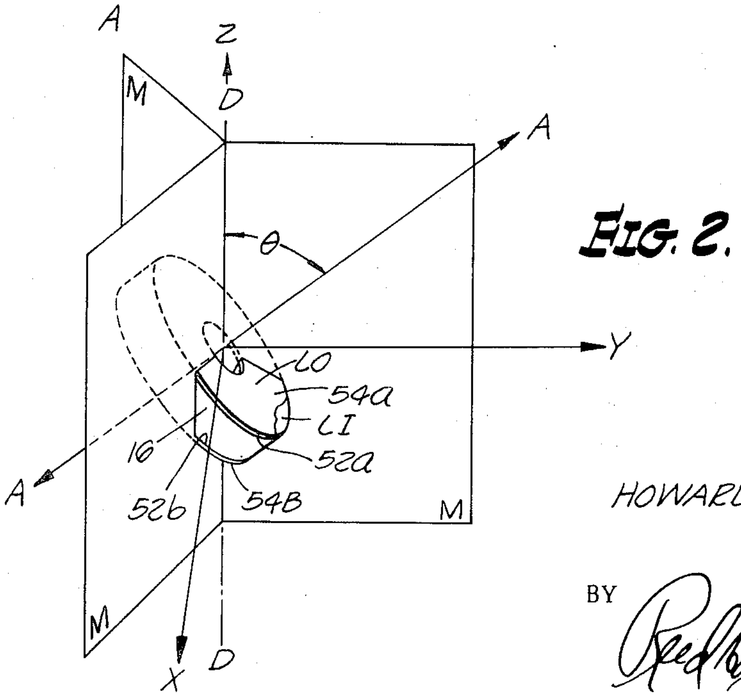

Lithium niobate crystals are of the crystal class that have symmetry properties belonging to the 3m group. As illustrated in FIG. 2, the crystal has three mirror planes M that extend in directions parallel to the Z, or optical, axis. These planes intersect in pairs parallel to the optical or Z axis and they are separated by dihedral angles of 120°. The mirror planes are shown as if they originate in a common axis D—D which is parallel to the optical axis Z. In fact, of course, the planes extend indefinitely so that each plane intersects the angle between each of the other two planes, thus accounting for the 120° separation between the planes. Because of the three-fold symmetry, each mirror plane M may be considered to include a Y axis, which is perpendicular to the Z axis. Furthermore, the X axis with respect to each plane of symmetry lies in a direction perpendicular to both the Y axis and the Z axis. Stated differently, an X axis is perpendicular to the corresponding mirror plane M.

The maximum sensitivity of this accelerometer in response to compression forces, occurs for a force applied in a direction that is perpendicular to the Z−51.4° plane of the crystal.

A lithium niobate crystal is characterized by eight piezoelectric coefficients of which four are mutually independent, as illustrated in the following matrix:

STRESS MODE

| Output Mode | 1<br>Compression Axis<br>X | 2<br><br>Y | 3<br><br>Z | 4<br>Shear axis<br>X | 5<br><br>Y | 6<br><br>Z |
|---|---|---|---|---|---|---|
| 1. "X" | O | O | O | o | $d_{15}$ | $d_{16}=-2d_{22}$ |
| 2. "Y" | $d_{21}=-d_{22}$ | $d_{22}$ | 0 | $d_{24}=d_{15}$ | O | O |
| 3. "Z" | $d_{31}$ | $d_{32}=d_{31}$ | $d_{33}$ | O | 0 | O |

Where the various piezoelectric coefficients $d_{ij}$ have the values:

$d_{15} = 6.8 \times 10^{-11}$ C/N $d_{22} = 2.1 \times 10^{-11}$ C/N $d_{31} = -0.1 \times 10^{-11}$ C/N $d_{33} = 0.6 \times 10^{-11}$ C/N where C/N is the abbreviation for Coulombs per Newton. In the term $d_{ij}$, the first subscript refers to the electroded faces of the crystal, and the second subscript refers to the type and direction of stress. The numbers 1, 2, and 3 represent compressive stress in the X, Y, and Z directions respectively, and the numbers 4, 5, and 6 represent shear moments about the X, Y, and Z axes respectively.

The above piezoelectric matrix is an example of a mathematical quantity called a tensor. There exists known mathematical rules for calculating how a tensor, expressed in a particular coordinate system, changes when viewed from another rotated coordinate system. Expressing the above piezoelectric tensor in a rotated coordinate systems is the equivalent of calculating the piezoelectric matrix for a crystal cube whose faces are oriented to such a rotated coordinate system. Such calculations for lithium niobate can be performed with the aid of a computer.

For the annular piezoelectric crystal of this invention having its axis A—A at an angle of −51.4° from the Z axis, the following matrix shows the piezoelectric coefficients, in $10^{-12}$ Coulombs per Newton, obtained:

STRESS MODE

| Output Mode | 1 | 2 | 3 | 4 | 5 | 6 |
|---|---|---|---|---|---|---|
| | Compression Axis | | | Shear Axis | | |
| | X | Y−51.4° | Z−51.4° | X | Y−51.4° | Z−51.4° |
| 1. X | 0 | 0 | 0 | 0 | 9.59 | −79.37 |
| 2. Y−51.4° | −12.32 | −18.15 | 27.34 | 8.71 | 0 | −79.37 |
| 3. Z−51.4° | −17.04 | −17.48 | 37.01 | −0.02 | 0 | 0 |

For the crystal of this invention with the electrodes on the Z−51.4° faces of the crystal, there is no response to shear stresses about the Y−51.4° axis or Z−51.4° axis and only a very small response to shear stresses about the X axis since the $d_{34}$ coefficient is equal to −0.02. The $d_{34}$ coefficient can be made as small as desired by refining the rotation angle. For example, for a Z−51.383° rotation, the $d_{34}$ coefficient is $0.001 \times 10^{-12}$ C/N. The fact that the $d_{34}$ coefficient is equal to zero at some angles of rotation about the axis is due to the crystal's 3m symmetry. The exact position of this angle is dependent on the values of the piezoelectric coefficients. That is, a crystal that is composed substantially of lithium niobate, but which also contains some impurities, might have slightly different coefficients than the ones given above and therefore its $d_{34}$ coefficient would be equal to zero at an angle slightly different than Z−51.4°.

THe crystal of this invention has only its Z−51.4° surfaces in electrical communication with the utilization device 24. Since the shear coefficients are all negligible, the transducer can only respond to compression stresses parallel to the X, Y−51.4°, and Z−51.4° axes. The accelerometer illustrated in FIG. 1 has its inertial mass positioned such that compression stresses parallel to the Z−51.4° axis are applied to the crystal when the accelerometer is accelerated in a direction parallel to the Z−51.4° axis. Acceleration perpendicular to the Z−51.4° axis does not result in compression stresses along X or Y−51.4° axes. Hence, the instrument is sensitive to acceleration in a direction parallel to the Z−51.4° axis but not to acceleration perpendicular to the Z−51.4° axis.

The accelerometer of this invention is, however, subject to primary and secondary pyroelectric effects which produce changes in the output of the accelerometer. However, such temperature changes usually occur slowly and produce responses having an extremely low frequency when compared to the frequency of the responses due to acceleration. Thus, these low frequency responses may be filtered out leaving only the responses due to acceleration.

Thus, when the accelerometer of FIG. 1 is accelerated in a direction parallel to the axis A—A of maximum sensitivity, a charge is generated between the electrodes 54*a* and 54*b* of each crystal that is proportional to the acceleration, and when the accelerometer is accelerated in some other direction, the only generated signal of any significance is from the component of acceleration along the axis A—A.

Special precautions are taken to provide for long life of these accelerometers when they are used at high temperatures and low pressure, or in the present of slightly reducing atmosphere. Such precautions are important because, as is well known, lithium niobate tends to be reduced, that is, lose its oxygen, when exposed to an atmosphere in which the partial pressure of oxygen is low. The rate of reduction increases with the temperature. Such reduction results in removal of some of the oxygen from the crystal, thereby reducing the electrical resistivity of the crystal. Such reduction is retarded, if not entirely prevented, by providing communication of the crystal with an oxygen-containing atmosphere. For this purpose, the accelerometer shown in FIG. 1 is provided with a perforation 30 in the wall of the case 12 to provide a channel for ingress of oxygen from the outer atmosphere into the cavity within the case.

This invention has been described with reference to an accelerometer because of the particular usefulness of the invention in such an accelerometer. However, this invention may also be employed in other types of transducers that employ force sensing elements, such as pressure transducers.

It is thus seen that this invention provides an accelerometer which may be employed for a prolonged period at high temperatures; and when employing a lithium niobate crystal cut and used as described, the invention provides an accelerometer which is capable of use at high temperatures for prolonged periods; and in particular, provides such an accelerometer of high sensitivity. Though the accelerometer of this invention is particularly suitable for use at high temperatures, because of the fact that the crystal material possesses high electromechanical efficiency (ratio of electrical power generated to the mechanical power produced in the crystal by the acceleration), it is also advantageous to employ the accelerometers at low temperatures.

The invention claimed is:

1. In a transducer of the compression type in which an electrical signal is developed across two flat parallel faces of a piezoelectric element in response to the relative motion of two mechanical members adapted to move relatively to each other in response to forces parallel to an axis perpendicular to such faces, said element being mounted between said two mechanical members, and in which means are provided for conducting such electrical signal to a utilization device responsive thereto, the improvement wherein said piezoelectric element comprises a lithium niobate crystal having its Z-axis at an angle of about −51.4° ± 10° to an axis normal to said parallel faces.

2. A transducer as defined in claim 1 comprising an accelerometer wherein said element is of cylindrical configuration and in which one of said two members constitutes an inertial member supported by said element from the other of said two members and wherein said electrical signal is developed in response to the acceleration of an object that is secured to the other of said two members.

3. An accelerometer as defined in claim 2 wherein one of said members has a base provided with a base surface attachable to the surface of said accelerating object, said base surface being in a plane parallel to said flat parallel surfaces of said element.

4. An accelerometer as defined in claim 3 wherein communication is provided between said crystal and an oxygen containing atmosphere and providing a cover member cooperating with one of said two members for enclosing said crystal.

5. An accelerometer as defined in claim 2 comprising at least two annular piezoelectric elements mounted on a post secured to said base and having their sensitive axes anti-parallel with the outer surfaces thereof electrically connected together and having a common electrode between adjacent surfaces.

6. A transducer as defined in claim 1 in which said element has a central hole therein and a post extends through said element, said two members being composed of metal.

7. In a transducer of the compression type in which an electrical signal is developed across two flat parallel faces of a piezoelectric element in response to the relative motion of two mechanical members adapted to move relatively to each other in a direction perpendicular to such faces, which element is mounted between said two mechanical members, and in which means are provided for conducting such electrical signal to a utilization device responsive thereto, the improvement wherein said piezoelectric element comprises a lithium niobate crystal containing impurities, said crystal having a Z axis rotated $\theta$ °± 10° from an axis normal to said parallel faces, the angle $\theta$ being the counterclockwise angle through which the Z-axis is rotated about the X axis such that the $d_{34}$ piezoelectric coefficient is equal to zero.

8. A transducer as defined in claim 7 wherein the angle $\theta$ is equal to about 51.4°.

* * * * *